(12) United States Patent
Kim et al.

(10) Patent No.: US 7,688,455 B2
(45) Date of Patent: Mar. 30, 2010

(54) MULTI POSITION DETECTING METHOD AND AREA DETECTING METHOD IN INFRARED RAYS TYPE TOUCH SCREEN

(75) Inventors: Kil-Sun Kim, 133 Juyeop-Dong, Ilsan-Gu, 1405-808 Munchon Maeul, Goyang-Si, Gyeonggi-Do (KR) 411-750; Yong-Chul Kim, Goyang-Si (KR)

(73) Assignees: Nexio Co., Ltd., Incheon (KR); Kil-Sun Kim, Goyang-Si (KR)

( * ) Notice: Subject to any disclaimer, the term of this patent is extended or adjusted under 35 U.S.C. 154(b) by 5 days.

(21) Appl. No.: 12/159,774

(22) PCT Filed: Sep. 27, 2007

(86) PCT No.: PCT/KR2007/004721

§ 371 (c)(1),
(2), (4) Date: Jun. 30, 2008

(87) PCT Pub. No.: WO2008/039006

PCT Pub. Date: Apr. 3, 2008

(65) Prior Publication Data

US 2008/0304084 A1    Dec. 11, 2008

(30) Foreign Application Priority Data

Sep. 29, 2006   (KR) .................. 10-2006-0095398

(51) Int. Cl.
*G01B 11/14*    (2006.01)
(52) U.S. Cl. ..................... 356/614; 356/622

(58) Field of Classification Search ......... 356/614–615, 356/621–622; 345/173–180, 156, 157; 178/18.01–18.11, 178/19.01–19.05; 341/22
See application file for complete search history.

(56) References Cited

U.S. PATENT DOCUMENTS

| 2003/0063073 A1 | 4/2003 | Geaghan et al. | |
| 2006/0066590 A1* | 3/2006 | Ozawa et al. | 345/173 |
| 2009/0135162 A1* | 5/2009 | Van De Wijdeven et al. | 345/175 |

FOREIGN PATENT DOCUMENTS

| WO | WO 2005/022372 | 3/2005 |
| WO | WO 2005/114369 | 12/2005 |

* cited by examiner

*Primary Examiner*—Gregory J Toatley, Jr.
*Assistant Examiner*—Tri T Ton
(74) *Attorney, Agent, or Firm*—IPLA P.A.; James E. Bame

(57) ABSTRACT

A method for detecting the coordinates of multiple touching objects on an infrared touch screen, embodied on an apparatus, includes measuring and storing the maximum received level of a pair of infrared emitting and receiving elements, and initializing an index variable for identification of multiple touched spots, determining that the screen has been touched when a received level of a pair of infrared emitting and receiving elements, emission and reception of which is impeded by an object, is less than the maximum level, measuring the minimum level to detect center coordinates of the object, and reading an index variable for the center coordinates and determining that the center coordinates are new and setting an index variable for the center coordinates if no index variable is read for the center coordinates and storing the center coordinates and the index variable for the center coordinates.

3 Claims, 6 Drawing Sheets

[Fig. 1]
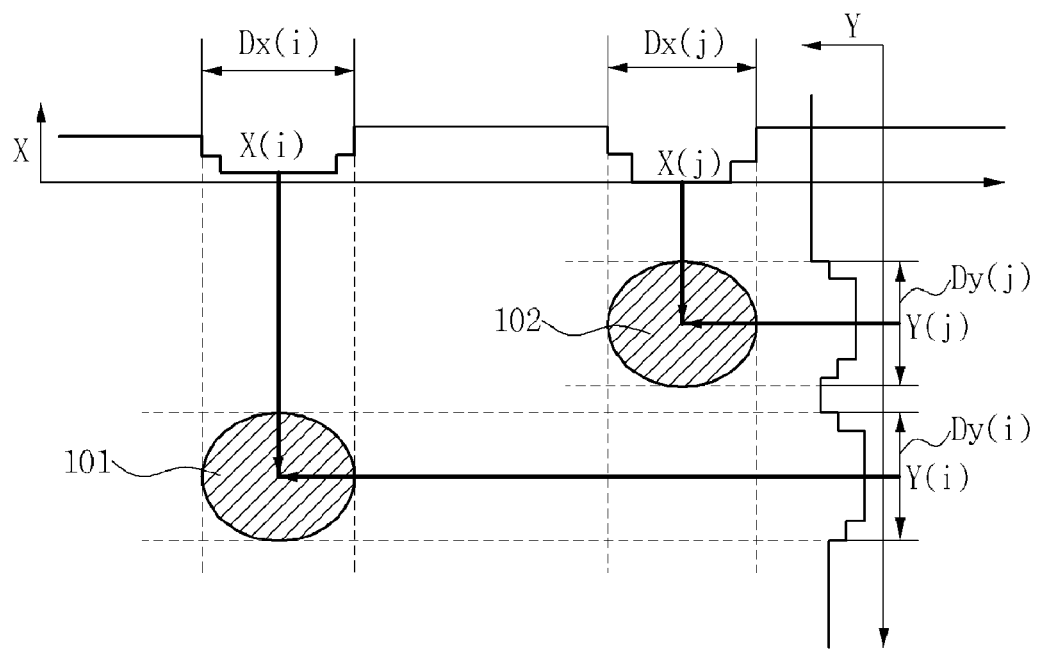
[Fig. 2]
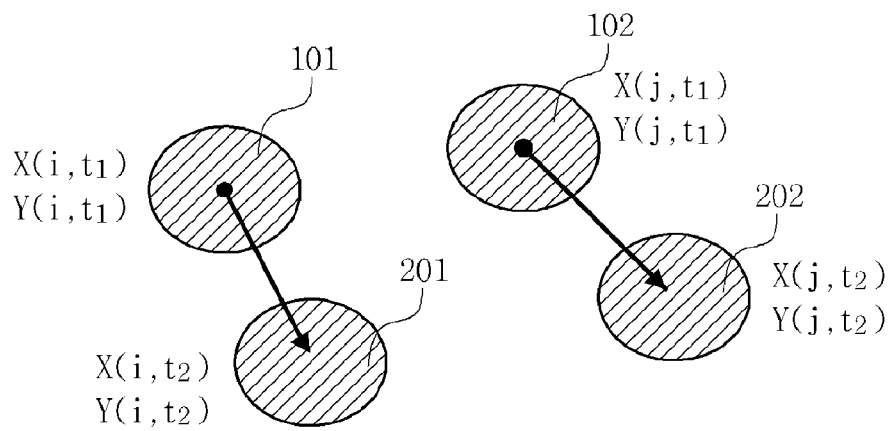

[Fig. 3]
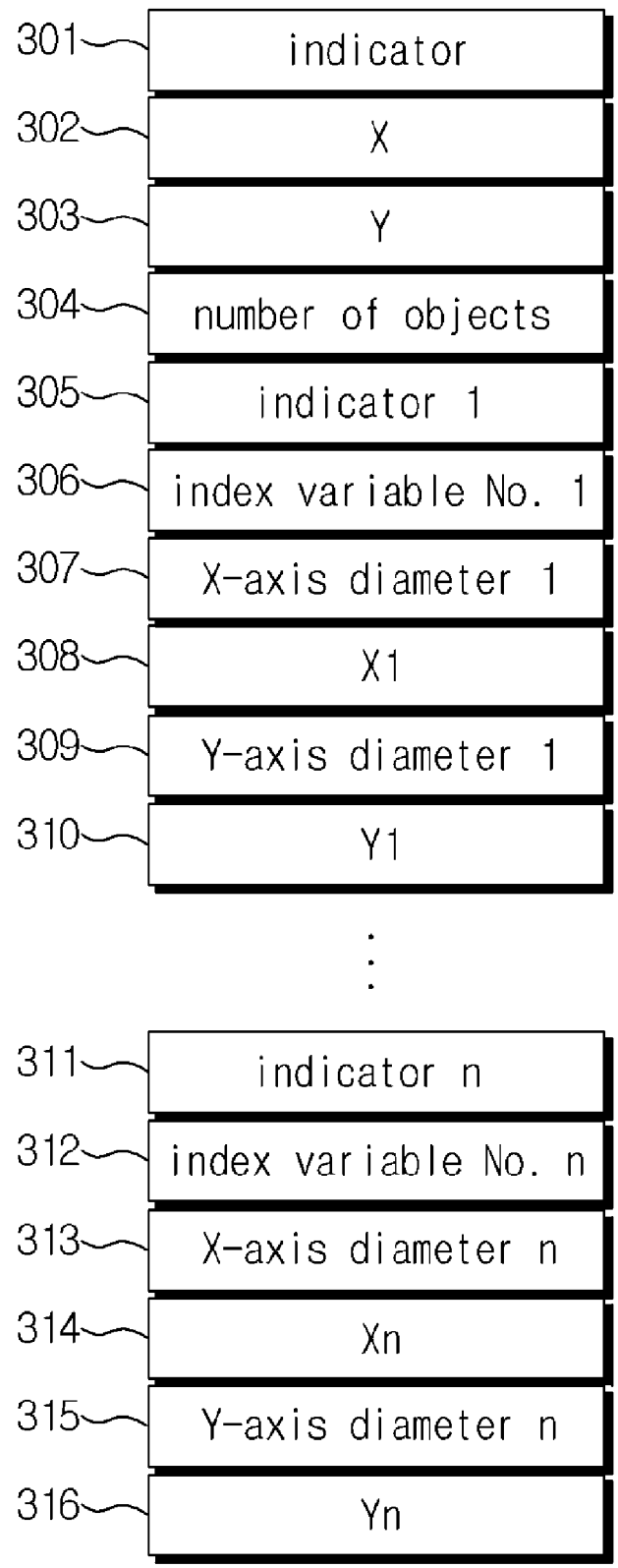

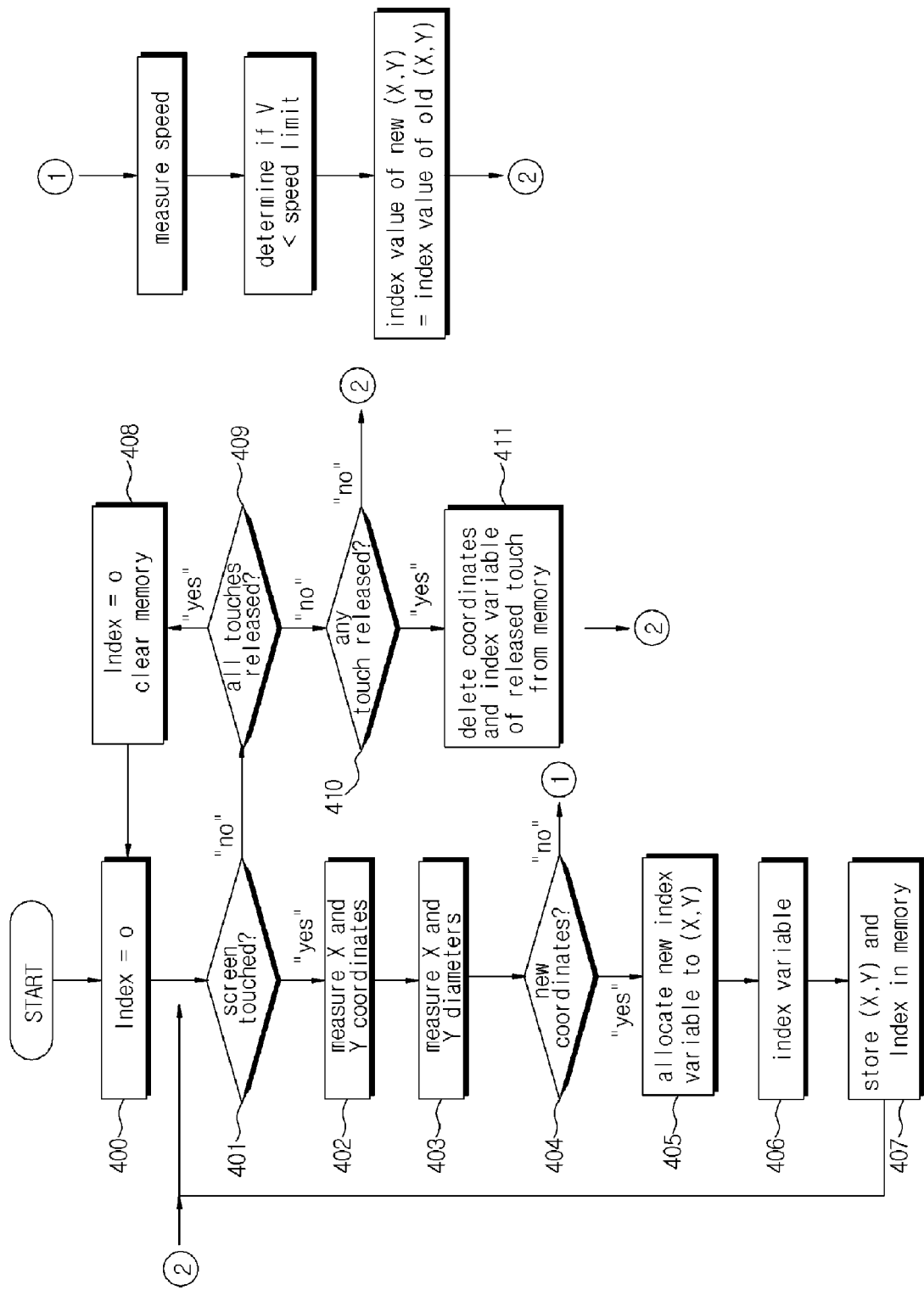
[Fig. 4]

[Fig. 5]
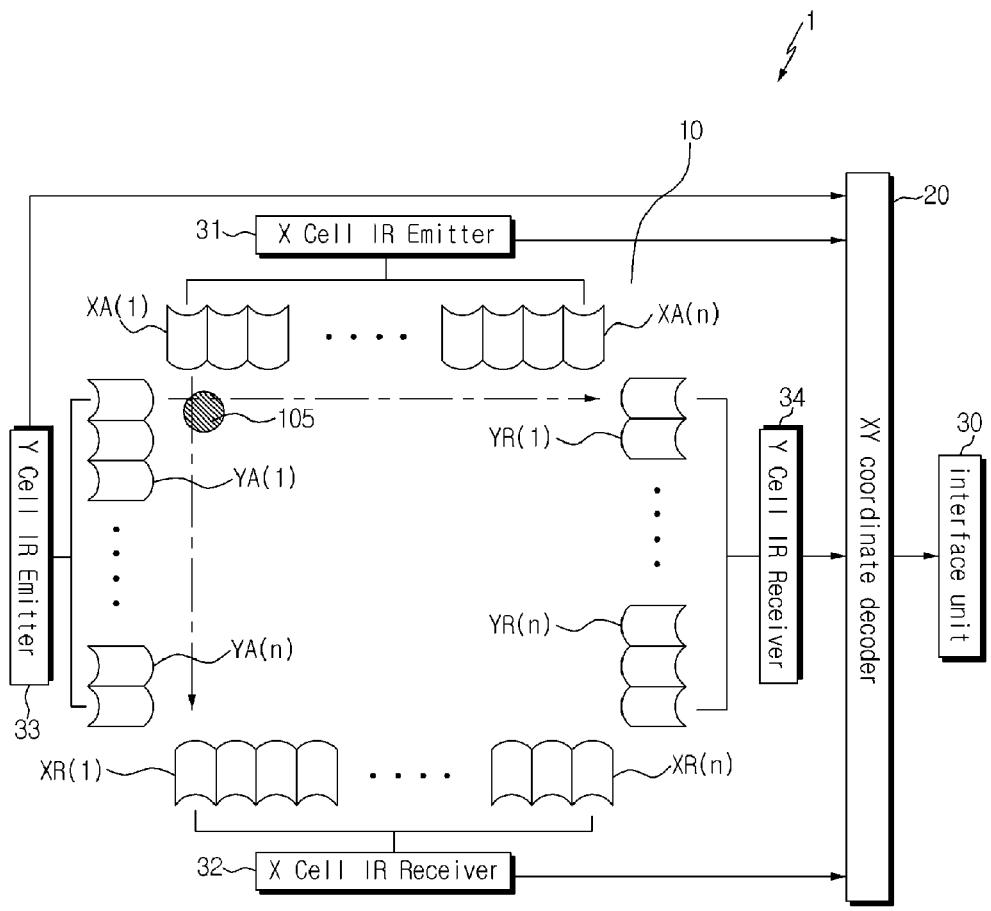

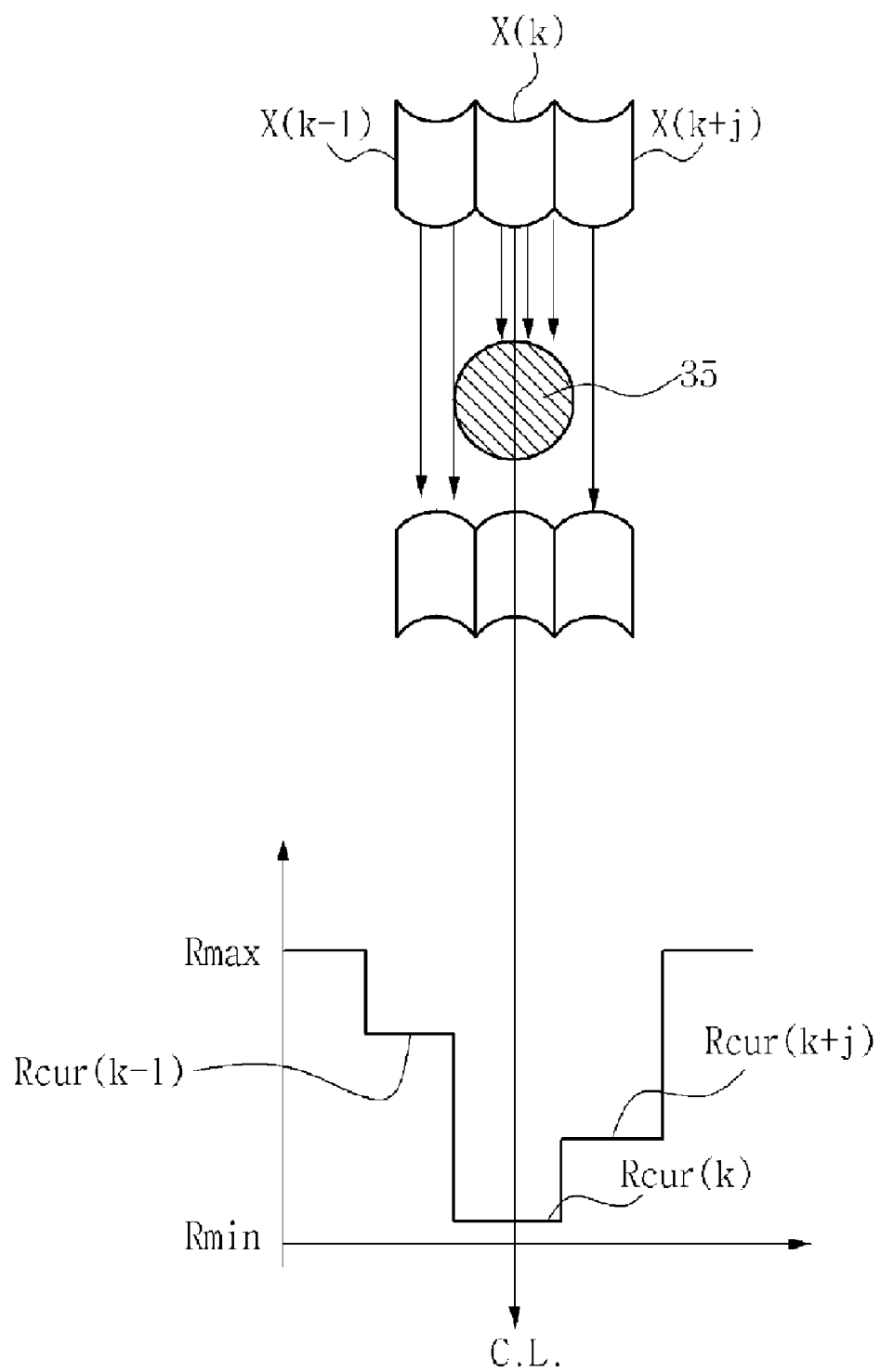
[Fig. 6]

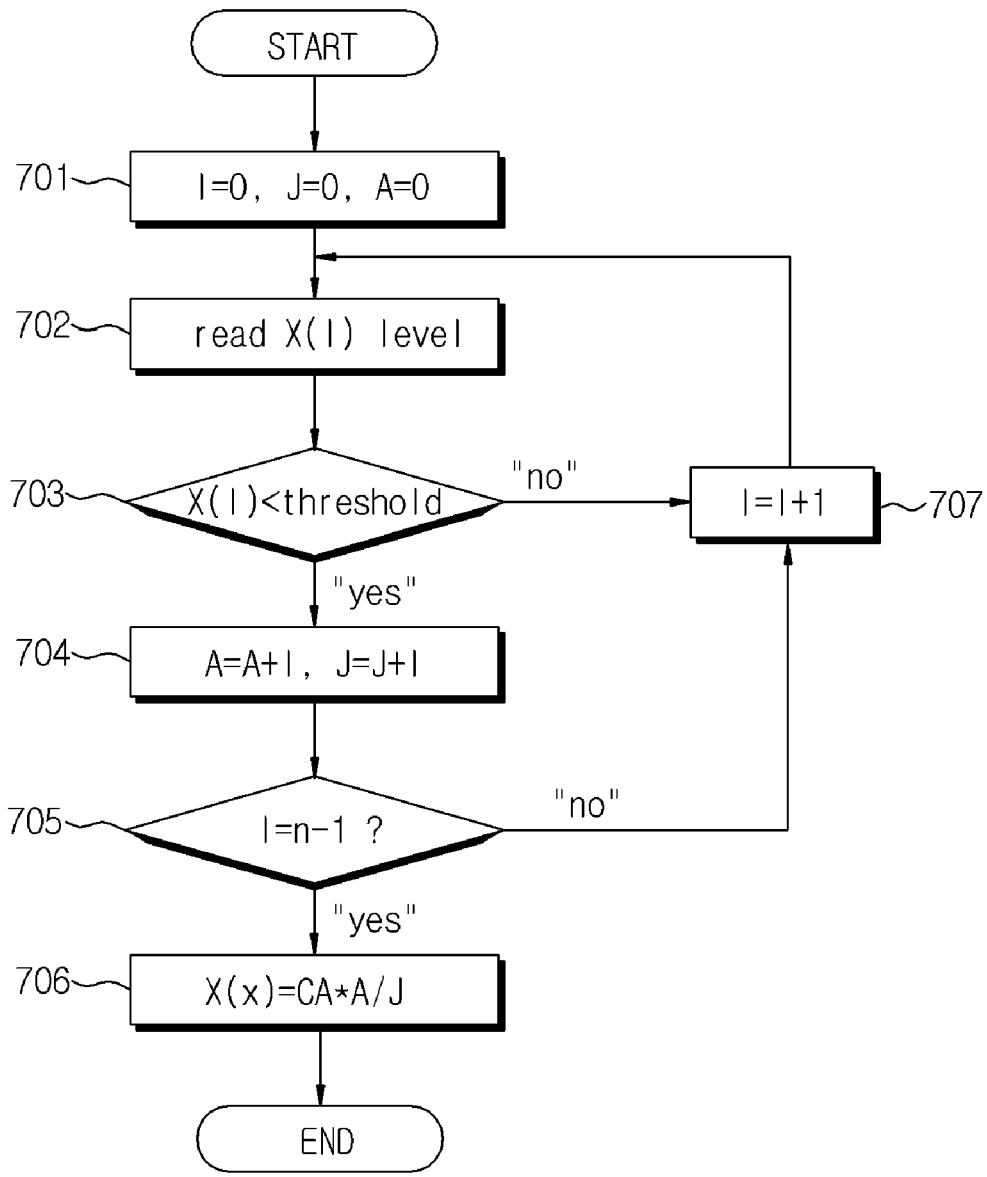
[Fig. 7]

MULTI POSITION DETECTING METHOD AND AREA DETECTING METHOD IN INFRARED RAYS TYPE TOUCH SCREEN

TECHNICAL FIELD

The present invention relates to a method for detecting the coordinates of a plurality of objects touched on an infrared touch screen, and more particularly to a method for detecting the coordinates of a plurality of objects touched without errors when the plurality of objects are touched on the infrared touch screen.

The present invention also relates to a method for detecting the area of an object touched on the infrared touch screen.

BACKGROUND ART

Generally, the touch panel is one of a variety of devices for providing interfaces between users and information and communications devices which use a variety of displays. Specifically, the touch panel is an input unit through which the user can interface with the information and communications device by directly touching its screen with their finger or pen.

The touch panel allows users to interactively and intuitively operate a computer or the like simply by touching buttons displayed on its display with their finger so that men, women, and children can easily use it as an input device. Thus, the touch panel is applied to a wide variety of fields such as PDAs, LCDs, CRTs, equipment for banks or public offices, various medical equipment, travel guides, guidance equipment for main facilities, and transportation guides.

Operating or implementing types of the touch panel include a resistive (or conductive) film type, an ultrasonic type, and an infrared matrix type. The conductive film type touch panel has a panel structure with a chemical agent coated between a glass and a thin film and thin metal plates attached to X and Y-axis sides of the panel. When power is supplied to a panel of this type, a specific resistance is created through the panel. Then, if a finger or other object touches a position on the panel, the chemical agent reacts to instantly change resistance at the position. The resistance change is detected at the metal plates on the sides of the panel and the coordinates of the touched position are determined from the detected resistance change.

The infrared matrix type touch panel has horizontal and vertical infrared emission and detection arrays that are arranged on four sides of the panel to produce infrared rays in the shape of very close cross stripes on the panel. When an object touches a position on this panel, the object blocks an infrared ray that passes through the touched position and the blocking is detected to acquire position information of the touching object.

The infrared type touch panel is generally constructed as follows. A controller is provided on one portion of a PCB plate and a display part is provided on the other portion of the PCB plate. A non-reflective acrylic plate is provided on the front of the display part. A plurality of pairs of horizontal infrared emitting and receiving elements are provided on upper and lower edges of the display part and a plurality of pairs of vertical infrared emitting and receiving elements are provided on left and right edges of the display part to create an infrared matrix. A screen is provided on the rear of the display part. When a user touches a portion of the infrared matrix formed by the infrared emitting and receiving elements with their finger, an infrared ray at the touching portion is blocked to detect the position of the portion. The infrared matrix is controlled by the controller formed on one portion of the PCB plate.

DISCLOSURE OF INVENTION

Technical Problem

However, the user does not always touch the center of a cell corresponding to the pair of horizontal infrared emitting and receiving elements and the pair of vertical infrared emitting and receiving elements. The user may sometimes touch a position deviated from the center of the cell, for example, a corner or periphery of the cell. The conventional touch panel has a limited resolution determined according to the number of infrared emitting and receiving elements and can detect the coordinates of an object only with the limited resolution. Thus, it is difficult for the conventional touch panel to detect accurate coordinates of an object when the object touches a position on the panel deviated from the center of a cell. In addition, to detect highly accurate coordinates of an object which touches the panel, it is necessary to increase the resolution and thus to increase the number of infrared emitting and receiving elements. However, this results in an increase in the manufacturing costs.

Also, the conventional touch panel detects only one spot at which an object has touched the touch panel. When the touch panel has been touched at multiple positions simultaneously or sequentially, X and Y coordinates of each touched position (or spot) cannot be read accurately so that the multiple touching is detected as an error.

In addition, the conventional touch panel reads only the coordinates of a spot at which an object has touched the touch panel and cannot determine whether the area of the touched spot is large or small. For example, the area of the touched spot is small when the touch panel is touched by a pen or the like and is relatively large when the touch panel is touched by a finger. In some case, there may be a need to detect a different touched spot and to display a different detection result, depending on the area of the touched spot. The conventional touch panel cannot appropriately cope with such various types of touches. The conventional touch panel also has a problem in that it must provide a touch detection error when touches have been detected at different spots through multiple infrared emitting elements.

Therefore, the present invention has been made in view of the above problems, and it is an object of the present invention to provide a method for detecting the coordinates of positions of a plurality of objects touched on an infrared touch screen, which can accurately read X and Y coordinates of each touched position (or spot) when the touch panel has been touched at multiple positions simultaneously or sequentially.

It is another object to provide a method for detecting the area of a touched spot on an infrared touch screen, which can detect the area of each touched spot to appropriately cope with various types of touches.

Technical Solution

In accordance with an aspect of the present invention, the above and other objects can be accomplished by the provision of a method for detecting the coordinates of multiple positions on an infrared touch screen of a touch panel including a plurality of X-axis infrared emitting and receiving elements and a plurality of Y-axis infrared emitting and receiving elements, the method comprising measuring and storing a maximum received optical level of a pair of infrared emitting and receiving elements, infrared emission and reception of which is not impeded by any object, and initializing an index variable used to identify multiple touched spots; determining that the touch screen has been touched when a received optical level of a pair of infrared emitting and receiving elements, infrared emission and reception of which is impeded by an object, is less than the maximum received optical level; measuring a minimum received optical level of the pair of infrared emitting and receiving elements to detect center coordinates of the object; and reading an index variable for the center coordinates and determining that the center coordinates are new and setting an index variable for the center coordinates if no index variable is read for the center coordinates and storing the center coordinates and the index variable for the center coordinates.

The method further comprises comparing each received optical level measured using all infrared emitting and receiving elements with the maximum received optical level and deleting and initializing all stored center coordinates and corresponding index variables if it is determined from the comparison that the touch screen has not been touched.

The method further comprises determining that the center coordinates are continuous, if a spot corresponding to the stored center coordinates with the index variable set for the center coordinates has been moved at a movement speed less than a preset movement speed limit, and storing center coordinates of the spot after the movement, replacing the stored center coordinates, for the index variable.

In accordance with another aspect of the present invention, there is provided the method for detecting the area of a touched spot on an infrared touch screen of a touch panel, the method further comprising measuring a received optical level of a pair of infrared emitting and receiving elements placed on a center axis of the object, a received optical level of a pair of infrared emitting and receiving elements corresponding to a left end of the object, and a received optical level of a pair of infrared emitting and receiving elements corresponding to a right end of the object and measuring and storing an X-axis diameter and a Y-axis diameter of a spot touched by the object based on the measured levels; and measuring an area of the touched spot based on the measured X and Y-axis diameters under assumption that the spot is an oval.

The method further comprises transmitting information, including an indicator of whether or not an object has touched the touch screen, the number of objects, the X and Y coordinates of each touching object on the touch screen, and X and Y diameters of each touching object, to a controller.

ADVANTAGEOUS EFFECTS

According to the present invention, it is possible to more accurately measure the coordinates of an object without increasing the number of infrared emitting and receiving elements. Even when objects have touched multiple spots on the touch panel, it is possible to accurately determine the X and Y coordinates of each touched spot, thereby overcoming the problem in the conventional touch screen in that touching multiple spots on the touch screen causes an error.

It is also possible to detect the area of each touched spot, thereby appropriately coping with the case where there is a need to detect a different touched spot and to display a different detection result, depending on the area of the touched spot. This overcomes the problems of the conventional touch panel in that it reads only the coordinates of a spot at which an object has touched the touch panel and cannot determine whether the area of the touched spot is large or small, thereby failing to appropriately cope with various types of touches.

BRIEF DESCRIPTION OF THE DRAWINGS

FIG. 1 illustrates the concept of multi-position coordinate detection according to the present invention FIG. 2 illustrates the concept of multi-position coordinate detection when each touched spot has moved;

FIG. 3 illustrates the concept of how the coordinates of multiple positions detected using a multi-position coordinate detection method according to the present invention are transmitted to an information device;

FIG. 4 is a flow chart showing each step of the multi-position coordinate detection method according to the present invention FIG. 5 illustrates a touch panel used in the multi-position coordinate detection method according to the present invention FIG. 6 illustrates infrared emission and reception using the touch panel of FIG. 5; and FIG. 7 is a flow chart illustrating how basic coordinates of an object are measured according to the present invention.

MODE FOR INVENTION OR DETAILED DESCRIPTION

A method for detecting the coordinates of multiple positions on an infrared touch screen, which can detect the area of each touched spot on the touch screen, according to the present invention will now be described with reference to the accompanying drawings.

As shown in FIG. 5, a touch panel 1 according to the present invention includes a display part 10, an XY coordinate decoder 20, and an interface part 30.

The display part 10 includes an X-axis infrared emitter 31, an X-axis infrared receiver 32, a Y-axis infrared emitter 33, and a Y-axis infrared receiver 34. The X-axis infrared emitter 31 includes a plurality of infrared emitting elements sequentially arranged in the X-axis direction. The X-axis infrared receiver 32 is arranged opposite the X-axis infrared emitter 31 and includes a plurality of infrared receiving elements that receive infrared rays emitted from the plurality of infrared emitting elements of the X-axis infrared emitter 31. The Y-axis infrared emitter 33 includes a plurality of infrared emitting elements sequentially arranged in the Y-axis direction. The Y-axis infrared receiver 34 is arranged opposite the Y-axis infrared emitter 33 and includes a plurality of infrared receiving elements that receive infrared rays emitted from the plurality of infrared emitting elements of the Y-axis infrared emitter 33.

The XY coordinate decoder 20 receives signals from the X-axis and Y-axis infrared emitters and receivers 31, 32, 33 and 34, and numerically calculates the coordinates of an object 35.

The interface part 30 transmits the calculated coordinate data of the object 105 from the XY coordinate decoder 20 to a controller (not shown) of an automation device such as a computer.

The infrared emitting elements of the number of n, XA(1), XA(2), . . . , and XA(n) are arranged in the X-axis infrared emitter 31 and the infrared receiving elements of the number of n, XR(1), XR(2), . . . , and XR(n) are arranged in the X-axis infrared receiver 32. In addition, the infrared emitting elements of the number of m, YA(1), YA(2), . . . , and YA(m) are arranged in the Y-axis infrared emitter 33 and the infrared receiving elements of the number of m, YR(1), YR(2), . . . , and YR(m) are arranged in the Y-axis infrared receiver 34.

A coordinate detection method using the touch panel constructed as described above will now be described with reference to FIGS. 6 and 7.

In the touch panel 1 according to the present invention, first, the infrared emitting elements arranged in the X-axis infrared emitter 31 sequentially emit infrared rays. For example, the X-axis infrared emitter 31 is constructed such that the infrared emitting element XA(1) first emits an infrared ray while the remaining infrared emitting elements XA(2), X(3), . . . , and XA(n) emit no infrared ray and then each of the remaining infrared emitting elements XA(2), X(3), . . . , and XA(n) emits an infrared ray in the order of XA(2), X(3), . . . , and XA(n) in the same manner while the other infrared emitting elements emit no infrared ray.

As shown in FIG. 6, the infrared emitting elements arranged in the X-axis infrared emitter 31 sequentially emit infrared rays and the infrared receiving elements arranged in the X-axis infrared receiver 32, which are paired with the infrared emitting elements, sequentially receive the emitted infrared rays. The levels of electrical signals corresponding to an optical signal read from the infrared receiving elements in the X-axis infrared receiver 32 which are paired with the infrared emitting elements, respectively, are converted into digital values and the digital values are then stored as X(I). Then, it is determined whether or not each of X(I) are less than a predetermined minimum limit level. When a user touches a position on the touch panel 1, the touching impedes infrared emission from the infrared emitting element corresponding to the position, so that the level of the electrical signal read from the infrared receiving element corresponding to the position is less than the minimum limit level. Accordingly, if X(I) is less than the minimum limit level, it is determined that the object 35 is positioned between a pair of the infrared emitting and receiving elements and its coordinate are calculated.

Basic coordinates of the object 35 about X-axis and Y-axis are calculated by the following equation.

$$X(n) = CA \times A_i / J_i,$$

where $A_i = A_{i-1} + I_i$, $J_i = J_{i-1} + 1$, $J_0 = 0$, $A_0 = 0$, $I_0 = 0$, $i = 1, 2, 3, \ldots, n$, and $CA = 1000/n$ if logical resolution for calculation is "1000" and the number of infrared emitting or receiving elements is "n".

Then, detailed coordinates of the object are calculated. As shown in FIG. 6, elements X(k−l), X(k), and X(k+j) are infrared emitting and receiving elements which are impeded infrared reception by the object 35.

As shown in FIG. 6, a maximum received optical level Rmax of infrared emitting and receiving elements, infrared emission and reception of which is not impeded by the object 35, and a minimum received optical level Rmin of infrared emitting and receiving elements, infrared emission and reception of which is completely impeded by the object 35, are measured and stored. Then, a received optical level Rcur(k) of a pair of infrared emitting and receiving elements X(k), which are placed on the center axis of the object 35, a received optical level Rcur(k−l) of a pair of infrared emitting and receiving elements X(k−l) corresponding to the left end (or leftmost portion) of the object 35, and a received optical level Rcur(k+j) of a pair of infrared emitting and receiving elements X(k+j) corresponding to the right end (or rightmost portion) of the object 35 are measured and stored.

The detailed coordinates of the object 35 can be calculated by measuring the difference between the received optical levels of infrared receiving elements corresponding to the right and left ends of the object 35 as described above. For example, a coordinate error is "100" if the number of X-axis infrared receiving elements is "10" and the logical resolution has a value of "1000". To reduce this error, a variation in the range of 0 to 50 indicating a deviation from the center of the object 35 in the detailed coordinates with a detailed coordinate resolution of "100" can be calculated by measuring the difference between received optical levels of infrared receiving elements, infrared emission and reception of which is impeded by outermost portions (e.g., right and left ends) of the object 35.

The detailed coordinates $(F_x, F_y)$ of the object 35 are calculated using the following equations by comparing the maximum received optical level with the received optical levels of the infrared receiving elements corresponding to the right and left ends of the object 35.

[Math Figure 1]
$$F_x = \frac{(R_{max}(k-l) - R_{cur}(k-l))}{R_{cur}(k-l)} \times A - \frac{(R_{max}(k+j) - R_{cur}(k+j))}{R_{cur}(k+j)} \times A$$

and $$F_y = \frac{(R_{max}(k-l) - R_{cur}(k-l))}{R_{cur}(k-l)} \times A - \frac{(R_{max}(k+j) - R_{cur}(k-j))}{R_{cur}(k+j) \times A},$$

where "A" denotes a resolution of the detailed coordinates and, if the resolution "A" of the detailed coordinates is set to 100, $F_x$ and $F_y$ can be calculated as a value in the range of 0 to 100.

The final accurate coordinates (X(x), Y(y)) of the object can be obtained by substituting the values obtained by the equations of Math FIG. 1 into the following equations.

[Math Figure 2]
$$X(x) = CA_x \times X(k) + \frac{F_x}{A} \times CA_x$$

and $$Y(y) = CA_y \times Y(k) + \frac{F_y}{A} \times CA_y,$$

where CA="logical resolution"/"number of elements" and ($CA_x \times X(k)$, $CA_y \times Y(k)$) are the basic coordinates of the object 35.

"CA" is 100 if the logical resolution is 1000 and the number of elements is 10.

Reference will now be made to a multi-position coordinate detection method using the coordinate detection method as described above.

FIG. 1 illustrates the concept of the multi-position coordinate detection according to the present invention. How the coordinates of the center of objects 101, 102 and the diameters of each objects 101, 102 are measured is described below with reference to FIG. 1. In FIG. 1, "X(i)" denotes the X coordinate of the center of the first object 101, "Dx(i)" denotes the diameter of a spot on the X axis of the infrared receiver covered by the first object 101, "Y(i)" denotes the Y coordinate of the center of the first object 101, and "Dy(i)" denotes the diameter of a spot on the Y axis of the infrared receiver covered by the first object 101. In addition, "X(j)" denotes the X coordinate of the center of the second object 102, "Dx(j)" denotes the diameter of a spot on the X axis of the infrared receiver covered by the second object 102, "Y(j)" denotes the Y coordinate of the center of the second object 102, and "Dy(j)" denotes the diameter of a spot on the Y axis of the infrared receiver covered by the second object 102.

First, the infrared emitting elements XA(1), XA(2), ..., and XA(n) of the X-axis infrared emitter 31 scan infrared rays and then the levels of infrared rays received by the infrared receiving elements XR(1), XR(2), ..., and XR(n) of the X-axis infrared receiver 32 are measured. The X coordinates of the centers of the first and second objects 101 and 102 are calculated based on the levels of infrared rays covered by the first and second objects 101 and 102 as described above. The coordinates of outermost positions (i.e., right and left ends) of the spot covered by each of the first and second objects 101 and 102 are measured and the diameter Dx(i) of each of the first and second objects 101 and 102 on the X axis is calculated from the coordinates of the right and left ends.

Here, we omit a description of how the coordinates of the center and the diameter on the Y axis are calculated since the calculation method is similar to that described above.

Although the X-axis diameter Dx(i) and the Y-axis diameter Dy(i) of each object 101, 102 are measured under the assumption that the projection of the object is an oval, the present invention is not limited to this assumption and the diameter measurement may be based on the assumption that the projection of the object is a circle or oblong.

Each step of the multi-position coordinate detection method according to the present invention will now be described with reference to FIG. 4. First, the maximum received optical level of a pair of infrared emitting and receiving elements, infrared emission and reception of which is not impeded by any object, is measured and stored. An index variable (Index) used to identify multiple touched spots is initialized by setting it to zero.

It is determined that the touch screen has been touched if the received optical level of a pair of infrared emitting and receiving elements, infrared emission and reception of which is impeded by an object, is less than the maximum received optical level.

If it is determined that the touch screen has been touched, then the minimum received optical level of the pair of infrared emitting and receiving elements is measured and the coordinates (X, Y) of the center of the object are calculated and stored using the method described above. In addition, a received optical level of a pair of infrared emitting and receiving elements placed on a center axis of the object, a received optical level of a pair of infrared emitting and receiving elements corresponding to a left end of the object, and a received optical level of a pair of infrared emitting and receiving elements corresponding to a right end of the object are measured and an X-axis diameter Dx(i) and a Y-axis diameter Dy(i) of a spot touched by the object are measured and stored based on the measured levels. In the present invention, the area of the touched spot is calculated based on the measured X and Y-axis diameters under the assumption that the spot is an oval as described above.

The calculated coordinates of the object are compared with previously stored coordinates. If the calculated and stored coordinates are different, it is determined that the calculated coordinates are new and an index variable is allocated to the new coordinates. The new coordinates and the index variable are then stored in the memory.

Then, the infrared emitters again scan infrared rays and the infrared receivers receive the infrared rays. If it is determined from the received optical levels of the infrared receivers that the touch screen has been touched by an object, the coordinates (X(j), Y(j)) of the center of the object and the X-axis diameter Dx(j) and the Y-axis diameter Dy(j) of the object are measured and stored as described above. The measured coordinates of the object are compared with previously stored coordinates. If the measured and stored coordinates are different, it is determined that the measured coordinates are new and a new index variable (Index+1) is allocated to the new coordinates. The new coordinates and the index variable (Index+1) are then stored in the memory.

Even when multiple spots on the touch screen have been touched, respective coordinates of the multiple spots can be determined without causing errors or confusion since the respective coordinates of the multiple spots can be stored together with their index variables in the manner described above.

On the other hand, if the measured and stored coordinates are identical, it is determined whether or not the object has been moved. If the object has not been moved, the stored index variables and coordinates are kept unchanged.

The following is a description for the case where the object has been moved, for example where the object has been dragged while in contact with the touch screen. As shown in FIG. 2, when the object has been moved, information of the time when the object has touched the touch screen is additionally stored and information of the time after the object has been moved is also stored and the speed of the object is calculated from the time information. Specifically, when the first object 101 has touched the touch screen at time t1, information of the first object 101 before movement includes X(i1, t1) and Y(i1, t1) and information of the first object 101 after movement includes X(i2, t2) and Y(i2, t2) as shown in FIG. 2.

The movement distance and duration of the first object are calculated and the movement speed of the first object is calculated from the calculated distance and duration. If the calculated movement speed is less than or equal to a preset movement speed limit, it is determined that the coordinates are continuous and the index variable of the first object is kept unchanged while new coordinates (X(i2), Y(i2)) are stored together with the same index variable. Here, we omit a description of the movement of the second object since the same method is applied.

If the calculated movement speed of the first object is higher than the preset movement speed limit, it is determined that the coordinates are not continuous and a new index variable is allocated while new coordinates after the movement are stored together with the new index variable.

Then, the infrared emitters again scan infrared rays and the infrared receivers receive the infrared rays to determine whether or not one or more of the multiple touched spots have been released. Coordinates and index variables calculated from the received optical levels of the infrared receivers are then compared with previously stored coordinates and index variables. If it is determined from the comparison that any touched spot has been released, the stored center-axis coordinates and index variable corresponding to the released spot are deleted from the memory.

If it is determined that all touched spots have been released by comparing received optical levels measured through all pairs of infrared emitting and receiving elements with the maximum received optical level, all stored center-axis coordinates and index variables corresponding to the touched spots are deleted and initialized.

FIG. 3 illustrates the concept of how the coordinates of multiple positions detected using the multi-position coordinate detection method according to the present invention are transmitted to an information device.

As shown in FIG. 3, when the measured and calculated information of multiple spots are transmitted to another information device, the information includes an indicator 301 of whether or not a spot on the touch panel has been touched or whether or not a touched spot has been released, indicators 305 and 311 of whether or not each spot has been kept touched or has been released, index variables 306 and 312 allocated respectively to touched spots, respective X and Y coordinates 308, 310, 314, and 316 of touched spots, measured X and Y diameters 307, 309, 313, and 315 of touched spots, and the number of one or more measured objects 304.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a method for detecting the coordinates of multiple touching objects on an infrared touch screen, which can be applied to infrared touch screenfields in which it is possible to detect the coordinates of multiple touching objects without errors.

The invention claimed is:

1. A method for detecting the coordinates of multiple positions on an infrared touch screen of a touch panel including a plurality of X-axis infrared emitting and receiving elements and a plurality of Y-axis infrared emitting and receiving elements, embodied on an apparatus, the method comprising:

measuring and storing a maximum received optical level of a pair of infrared emitting and receiving elements, infrared emission and reception of which is not impeded by any object, and initializing an index variable used to identify multiple touched spots determining that the touch screen has been touched when a received optical level of a pair of infrared emitting and receiving elements, infrared emission and reception of which is impeded by an object, is less than the maximum received optical level measuring a minimum received optical level of the pair of infrared emitting and receiving elements to detect center coordinates of the object; and reading an index variable for the center coordinates and determining that the center coordinates are new and setting an index variable for the center coordinates if no index variable is read for the center coordinates and storing the center coordinates and the index variable for the center coordinates; and determining that the center coordinates are continuous, if a spot corresponding to the stored center coordinates with the index variable set for the center coordinates has been moved at a movement speed less than a preset movement speed limit, and storing center coordinates of the spot after the movement, replacing the stored center coordinates, for the index variable.

2. The method according to claim 1, further comprising: comparing each received optical level measured using the infrared emitting and receiving elements with the maximum received optical level and deleting all stored center coordinates and corresponding index variables if it is determined from the comparison that the touch screen has not been touched.

3. The method according to claim 1, further comprising transmitting information, including an indicator of whether or not a spot on the touch panel has been touched or whether or nor a touched spot has been released, indicators of whether or not each spot has been kept touched or has been released, index variables allocated respectively to touched spots, respective X and Y coordinates of touched spots, and the number of one or more measured objects, to an information device.

* * * * *